United States Patent [19]
Banton et al.

[11] Patent Number: 5,404,411
[45] Date of Patent: Apr. 4, 1995

[54] BITMAP-IMAGE PATTERN MATCHING APPARATUS FOR CORRECTING BITMAP ERRORS IN A PRINTING SYSTEM

[75] Inventors: Martin E. Banton, Fairport; William L. Lama, Webster; Michel J. Denber, Rochester, all of N.Y.

[73] Assignee: Xerox Corporation, Stamford, Conn.

[21] Appl. No.: 634,512

[22] Filed: Dec. 27, 1990

[51] Int. Cl.⁶ .......................... G06K 9/40; G06K 9/62
[52] U.S. Cl. ............................ 382/54; 382/30
[58] Field of Search .............. 382/54, 55, 30, 47; 358/455, 456, 459, 460

[56] References Cited

U.S. PATENT DOCUMENTS

| | | | |
|---|---|---|---|
| 3,464,062 | 8/1969 | Jensen | 382/54 |
| 3,961,132 | 6/1976 | Landsman | 358/460 |
| 4,196,454 | 4/1980 | Warren | 398/456 |
| 4,437,122 | 3/1984 | Walsh et al. | 358/166 |
| 4,486,785 | 12/1984 | Lasher et al. | 358/284 |
| 4,506,382 | 3/1985 | Hada et al. | 382/54 |
| 4,517,604 | 5/1985 | Lasher et al. | 358/262 |
| 4,547,812 | 10/1985 | Waller et al. | 358/459 |
| 4,646,355 | 2/1987 | Petrick et al. | 382/54 |
| 4,668,995 | 5/1987 | Chen et al. | 382/54 |
| 4,681,424 | 7/1987 | Kantor et al. | 355/14 R |
| 4,780,711 | 10/1988 | Doumas et al. | 340/728 |
| 4,805,228 | 2/1989 | Jenkins et al. | 382/54 |
| 4,847,641 | 7/1989 | Tung | 346/154 |
| 4,926,268 | 5/1990 | Kawamura et al. | 358/456 |
| 4,941,191 | 7/1990 | Miller et al. | 382/54 |
| 4,959,730 | 9/1990 | Tai et al. | 358/460 |
| 4,984,283 | 1/1991 | Sakano | 358/456 |

OTHER PUBLICATIONS

J. Crawford et al. (IBM Information Products Division), "Improved Print Quality by Recording Power Modulation", May 25, 1988, pp. i–8.

*Primary Examiner*—Leo H. Boudreau
*Assistant Examiner*—Michael Cammarata
*Attorney, Agent, or Firm*—Kenyon & Kenyon

[57] ABSTRACT

Improvements in bit-image quality in printing systems is achieved by providing several different pattern matching processors. Each pattern matching processor comprises a lookup table of patterns and corresponding replacement image patterns. A source image is modified by replacing areas in the source image that match patterns with the corresponding image patterns. Pattern matching processors are chosen depending on: the type of image being processed, input from the operator (user), feedback from the xerographic processor, and the color of the image. A user interface is provided which allows a user to download template and pattern data for each pattern matching processor. Pattern matching can be used to correct single-bit, half-bit, line-growth, xerographic effects and aliasing errors, and to provide control of print quality to the user.

9 Claims, 5 Drawing Sheets

```
32768  16384  8192  4096
 2048   1024   512   256
  128     64    32    16
    8      4     2     1
```

```
1024   512   256
  64    32    16
   4     2     1
```

BITMAP-IMAGE PATTERN MATCHING APPARATUS FOR CORRECTING BITMAP ERRORS IN A PRINTING SYSTEM

BACKGROUND OF THE INVENTION

The present invention relates to the modification of bitmap-images, and more particularly to the use of pattern matching in a computer or imaging system to improve the appearance of bitmap-images in hard copy computer output devices.

In the output of raster-scan imaging printers, diagonal edges in images may appear coarse or ragged. This is due to a limited spatial frequency between adjacent picture elements (pixels) or print elements (pels) and/or a limited gray-scale capability. This effect is formally known as "aliasing".

Several methods have been disclosed for improving image quality in printing systems by reducing aliasing. In "Improved Print Quality by Recording Power Modulation" by J. L. Crawford and C. D. Elzings, published May 25, 1988 by the Information Products Division of the I.B.M. Corporation, a method for improving bitmap-images is shown. To improve bitmap-image quality, the recording power can be modulated in response to decisions made by comparing the input data to a two-dimensional pattern. Furthermore, the improvements in bitmap-image quality are shown to have a large impact on human factors engineering. Other references relating to improving image quality are discussed below.

In U.S. Pat. No. 4,780,711 to Doumas, an assumed boundary lines method is described. In this method, an array of pixels in an image is selected and compared to a plurality of predetermined pixel array patterns. When a match is found, an assumed contour line is determined running through the array. The intensity of the center pixel of the array is chosen based on the angle of the assumed line through the array.

In U.S. Pat. No. 4,517,604 to Lasher et al., print element (pel) data is scanned into two arrays. The first array is scanned row by row to identify any black or white pel runs. White or black pels in the second array are overwritten with gray pels as a function of the pel runs identified in the first array. The method is then repeated column by column. The resulting second array will have reduced line width variations when compared to the first array.

U.S. Pat. No. 4,437,122 to Walsh et al. utilizes shift registers with decoders to generate an appropriate signal. Successive lines of pixel data are stored in successive parallel shift registers that are coupled to decoders. In these decoders, pixels surrounding a specific pixel are compared to each other in order to generate print head driving signals depending on whether curved or straight lines are being formed.

Another approach in controlling quality is shown in U.S. Pat. No. 4,486,785 to Lasher et al., where gray scale pels are introduced in close proximity to unit steps in a bitmap image. Whenever a unit step is found, the distance between the step and the nearest transition is computed. This distance is used in a look-up table for the appropriate gray scale values.

In U.S. Pat. No. 4,646,355 to Petrick et al., a method is shown for the removal of unwanted dots and voids. In this method, the user defines the smallest data item of a bitmap. Images smaller than this data item are removed in accordance with comparisons performed in a pixel window. In an n X n window of pixels, pixels along the perimeter are examined. If bordering pixels are of the same intensity, the internal pixels are changed to match these bordering pixels.

In U.S. Pat. No. 4,681,424 to Kantor et al., a method is disclosed for increasing the width of single pixel lines by advancing the leading edge of pulses defining a white-to-black transition and delaying the trailing edge of pulses defining a black-to-white transition. For lines parallel to the scan direction, gray pulses are added to widen lines.

In U.S. Pat. No. 4,847,641 to Tung, a method is disclosed for image enhancement through template matching. Piecewise bitmap patterns are matched to replace the central bit in the pattern with a unique compensation bit.

The use of stored bit arrays has been shown in other disclosures. A problem with the processes noted above is that the bit image manipulations are generally static and unchangeable. Also, the aforementioned methods do not address the possibility of using a different set of patterns on the same bitmap-image.

SUMMARY OF THE INVENTION

The invention relates to a method and system for programming the precise use of pattern matching for improving bitmap-image quality in printers. An image generation unit generates a binary source image (bitmap). A font library unit may be provided to assist in the generation of characters for the source image. The source image is loaded into memory and a rectangular template is scanned over it, left-to-right, top-to-bottom. The pattern under the template at any given point in the scan is compared to a pre-computed set of stored patterns. If a match is found, the part of the image under the template is replaced by a stored gray scale image that improves the final printed image. This process may be carried out either on binary images or gray scale images, using either binary or gray scale replacement patterns, as required by the particular application.

A user interface and an interface controller are provided, each with the capability of selecting which pattern-matching table modifies the source image. Different sets of patterns can be selected depending on the desired properties of the destination image, the type of data being output such as text, graphics, or halftones, and what color is being output. The destination image is transmitted to an IOT. A gray-writing Raster Output Scanner (ROS) can be placed between the pattern-matching processor 11 and the xerographic processor to enable the printing of intermediate levels of darkness. The xerographic processor is coupled to the interface controller and provides it with feedback. This feedback can be used to select a different pattern-matching table or to change the density of gray used in the ROS. In this context, ROS is intended to cover polygon scanners and print bars.

Source image errors, such as single-bit errors, can be corrected using the pattern matching method of the present invention. In addition, half-bits in the source image may be removed or made gray, and aliasing or line growth in the printed output may be reduced. For example, diagonal edges can be modified by inserting varying levels of gray along the diagonal edge depending on its angle. Also, unwanted bits can be removed, lines can be narrowed or thickened, prints can be made lighter or darker, and, generally, changes to the output image can be made to suit the viewer's preference. This can be accomplished with a system that allows the user to vary the patterns used to modify the image. The system can also operate automatically, e.g., to change the bitmap image to compensate for a change in the printer process.

The above is a brief description of some deficiencies in disclosed methods for improving bitmap-image printing quality and advantages of the present invention. Other features, advantages and embodiments of the invention will be apparent to those skilled in the art from the following description, accompanying drawings and appended claims.

DETAILED DESCRIPTION

Figure 1:
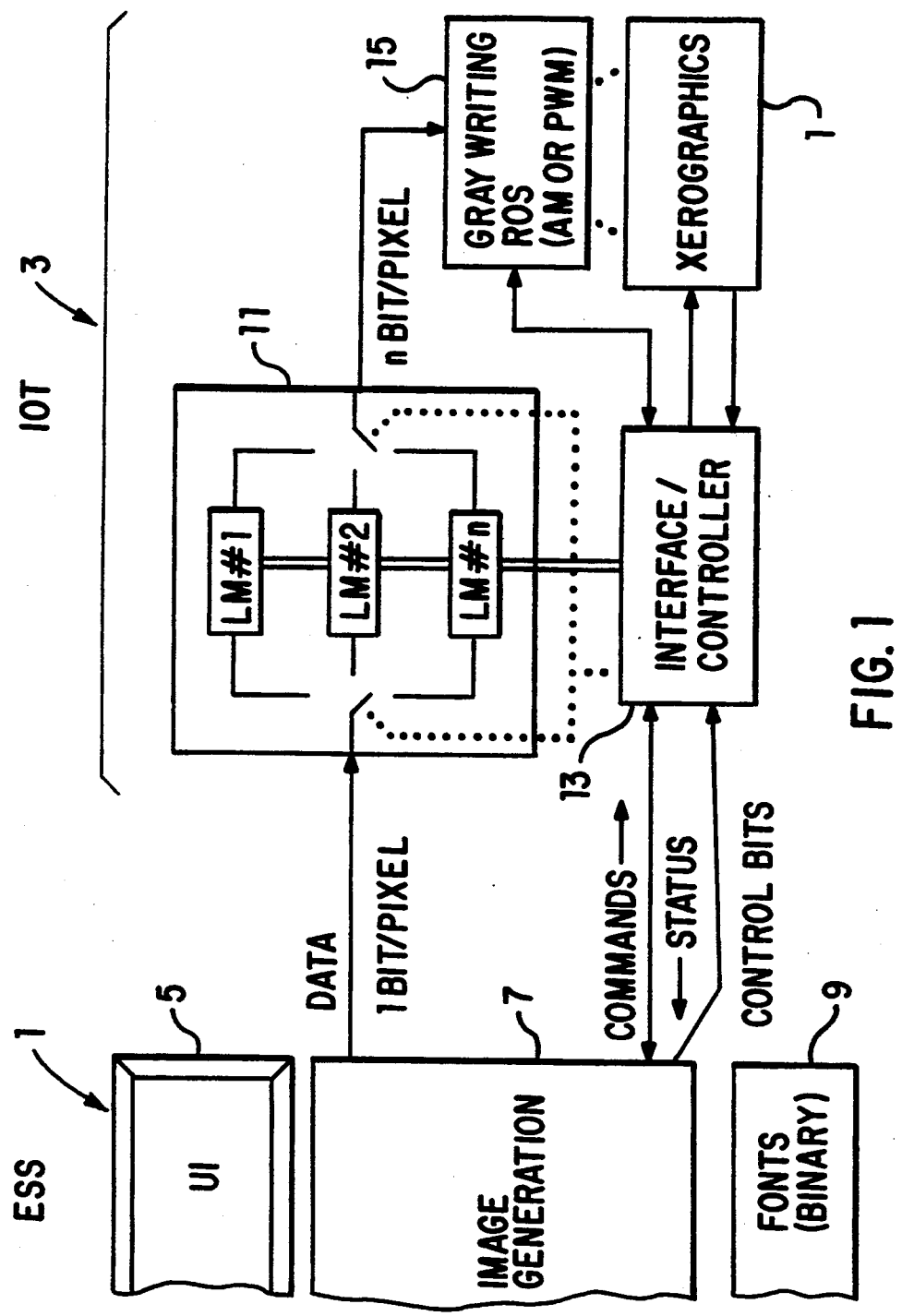
FIG. 1 is a block diagram of the programmable pattern matching system constructed according to the present invention.

Referring to FIG. 1, the general system of the present invention is shown. The system comprises two parts: an electronic subsystem, ESS 1 and an image output terminal, IOT 3. A previous combination of an ESS and an IOT is found in the 3700 print server manufactured by Xerox Corporation. The ESS 1, also known as an image processing system, includes a user interface, UI 5, an image generation unit 7, and a font library unit 9. The image generation unit 7 receives from a computer network or local memory device, image data encoded in ASCII or any of a variety of coding schemes, including bitmaps. This image can be of text or graphics. The image generation unit 7 converts this image data into binary pixel data, using the appropriate font(s) selected from the font library unit 9. In this embodiment, the image generation unit 7 will generate one bit for each picture element (pixel) or print element (pel), therefore, each pixel can be either on or off. The image generation unit 7 could also be used to generate several images simultaneously (e.g. color printing). In such an embodiment, the image generation unit 7 will send several bits per pixel. The generated image is sent in the form of a binary bit stream to the image output terminal, IOT 3.

The image output terminal, IOT 3 includes a pattern matching board 11, an interface controller unit 13, a raster output scanner or ROS 15, and an output device such as a xerographic processor 17 in this embodiment. The pattern matching board 11 receives the bit stream from the image generation unit 7. The interface controller unit 13 controls the operation of the pattern matching board 11 by selecting the appropriate pattern for the incoming bit stream. There are four different procedures for selecting the appropriate pattern. First of all, the user interface 5 can send a command signal through the ESS 1 to the interface controller 13 to select an appropriate pattern. Alternatively, control of the pattern matching board 11 can be internal in the IOT 3 using feedback from the xerographic processor 17.

The ESS can also send control bits in addition to commands. The control bits can change on a pixel by pixel basis and hence must be synchronous with the data bits from image generation unit 7. The control bits help select the logic mask to be used by, for example, identifying areas of the bitmap that represented a halftoned picture.

Finally, both the ESS 1 and IOT 3 can control the selection of patterns with user input and/or feedback from the xerographic processor 17. The system architecture also allows the downloading of patterns from the ESS 1 to the pattern matching board 11 via the interface controller 13. A pattern matching program is found in the appendix and will be further described below. The selected pattern will then be used to analyze and modify the bit stream sent by the image generation unit 7. Changes made to the bit stream will be discussed later in the description of FIGS. 2-5.

The modified bit stream is sent from the pattern matching board 11 to the ROS 15, which can be a polygon scanner (e.g., the Xerox 9700 printer incorporates such a device) or a print bar (e.g., the Kodak 1392 printer incorporates an LED bar). Each pixel in this modified bit stream is represented by n bits. Thus each pixel can have varying degrees of darkness and lightness, if the printer is using a gray-writing ROS. As an example, with 3 bits per pixel, eight different levels of gray can be used in the image. Alternatively, the eight levels of gray can serve as a palette where only two particular levels are chosen as determined by the interface controller 13. The ROS 15 modulates the pixel data using amplitude modulation, pulse-width modulation, etc. These modulated signals are then sent to the xerographic processor 17, which responds to different levels of gray shading for each pixel. The xerographic processor 17 then outputs the bit image data on a sheet of paper. Feedback from the xerographic processor 17 is sent to the interface controller 13. This feedback can be used to select a different pattern set in response to a function request by the user. The feedback could also be used to change the gray exposure levels of the ROS 15. For example, the selection of grays from the palette can be changed in response to this feedback. An example of this feedback is to compensate for excessive line growth, If sensors in the IOT 3 reflect that, for instance, line growth has increased for lines parallel to the process direction, the patterns could be changed in the pattern matching board 11 to reduce appropriately the gray levels in the pixels controlling the width of the parallel-to-the-process lines printed in the xerographic processor 17.

FIG. 1 shows switches at the input and output of the series of n pattern matching tables. In an alternate implementation, the data is processed simultaneously by several pattern matching tables with the output to the being chosen on a pixel by pixel basis.

The aforementioned system has many applications in improving bitmap-images. For instance, in a printer with more than one xerographic station (e.g., a highlight color printer with both black and color development stations), line growth might differ for black and color images. Color line growth may, for example, exceed black line growth, thus degrading the quality of the printed image. With the present invention a different pattern set can be used for the black and the color images. Horizontal and vertical lines, nominally of equal width, may have different line growth which causes the printed image to appear different. This can be corrected by using different patterns for horizontal and vertical lines. It should be understood that this can be generalized to IOTs with greater than two stations.

In converting images from one resolution to another (e.g. 240 spi to 300 spi), unwanted black pixels are frequently generated in various places on the printed image, such as along edges. A pattern set can be used to remove these unwanted extraneous pixels to improve image quality after conversion.

Another advantage of the present invention is its use for controlling the darkness of the printed image. In one method, the user can input the level of darkness for the printed image. User input at the user interface 5 can be used to modify the selection of patterns to set a certain gray level for each black pixel. Also, feedback from the xerographic processor 17 can be used by the interface controller 13 to change the patterns if the printed images are too dark or light.

Figure 2A:
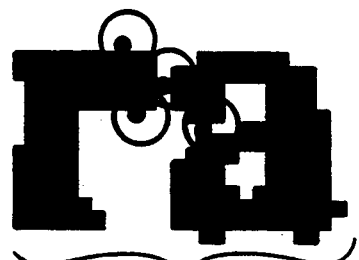
FIGS. 2a–e are graphical representations of single-bit errors in bitmap-images and patterns for their correction.

Different sets of patterns can be used on the same bitmap. For instance, images containing a combination of both graphics and text might be better modified by using different pattern sets for each type of data. The choice of patterns can be made through input at the user interface 5. There are several methods for improving bit-images in the aforementioned system. One problem addressed by the present invention is small errors that occur due to quantization of images in a device such as a facsimile machine. Examples of such errors are shown in FIG. 2a. A pattern matching table can be designed to automatically correct single-bit errors (extra or missing pixels) in images. Examples of the templates for correcting single-bit errors are shown in FIGS. 2b–d.

Figure 2B:
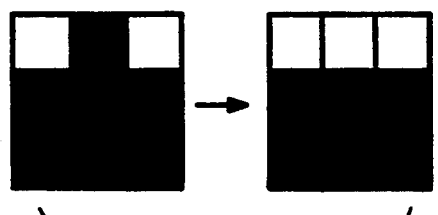

Referring to FIG. 2b, an edge-smoothing pattern is shown on the left. This pattern is compared to the bit-image to be corrected by scanning it across the image, left-to-right, top-to-bottom. Once a match is found, the pixel in the top-center of the 3×3 area is turned off. Use of this pattern has the effect of smoothing the top edge of horizontal lines. The pattern can also be rotated 180° for smoothing the bottom edge of horizontal lines as well as 90° for the left and right edges of vertical lines.

Figure 2C:
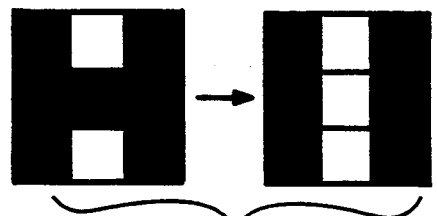

Referring to FIG. 2c, a bridge-removing template is shown on the left. Again, when a match is found between the pattern and a given 3×3 area in the bitmap, the center pixel in the 3×3 area is turned off as seen in FIG. 2c (right). This pattern can be rotated 90 degrees to remove bridges on vertical edges as well.

Figure 2D:
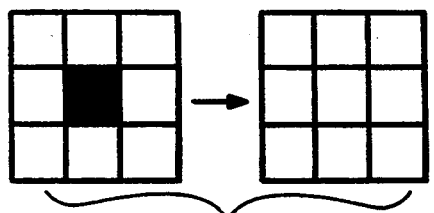
Figure 2E:
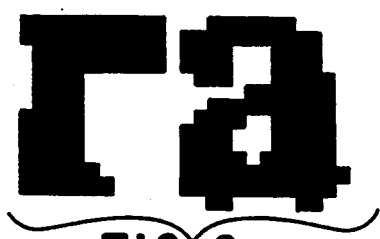

Referring to FIG. 2d, a dot-deletion pattern is shown on the left. When a match is found between the pattern and a 3×3 area in the bitmap the center pixel is turned off. Referring to FIG. 2e, the characters of FIG. 2a are shown after using the patterns mentioned above.

Figure 3A:
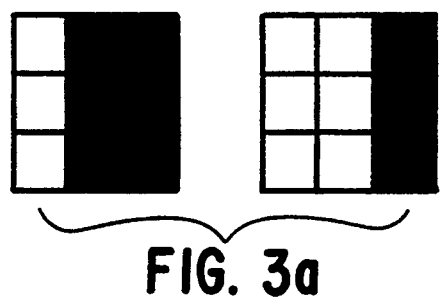
FIGS. 3a–d are graphical representations of patterns for the thinning of thick lines and half-bitted edges.
Figure 3B:
Figure 3C:
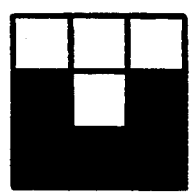
Figure 3D:
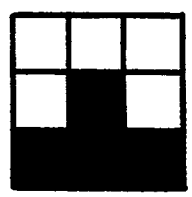

FIGS. 3a–c show another pattern matching scheme for thinning printed lines and removing unwanted half-bits. Referring to FIG. 3a, a pattern is shown on the left for edge-thinning a printed line. In write-black xerography, lines in the bitmap-image tend to become thicker when printed. Fonts designed for write-white printers will also appear thicker when printed on a write-black engine. When a match is found between the pattern and a 3×3 area in the bitmap-image, the line edge is thinned by one bit. The pattern shown can be rotated 90° to correct both horizontal and vertical edges. Also, rather than deleting pixels in order to thin edges, these pixels could be changed to gray to give an intermediate degree of thinning.

Referring to FIG. 3b, a half-bitted edge is shown. A half-bitted edge is characterized by alternating on and off pixels on a line edge. This has the effect of making the solid edge appear thicker by an amount approximately equal to a one-half bit, because the bits blur together when printed. Half-bitting is used extensively in many printer fonts, however, some printers are able to resolve the individual half bits, giving edges a rough appearance. To correct this problem, the templates shown in FIGS. 3c and 3d can be used. When a match is found between the pattern and an area in the bitmap, the half bits and off-bits adjacent to the solid edge can either be removed, or changed to gray on printers supporting gray levels. At normal viewing distances, the gray is perceived as a narrow extension of the width of the solid edge. The templates in FIGS. 3c and 3d can be rotated to effectively remove half bits from all horizontal and vertical lines.

Anti-aliasing

Figure 4A:
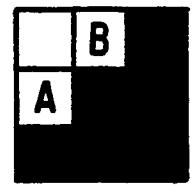
FIGS. 4a–b are graphical representations of patterns for the improvement of diagonal edges.
Figure 4B:
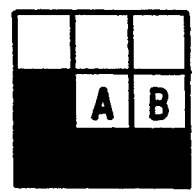
Figure 4B:
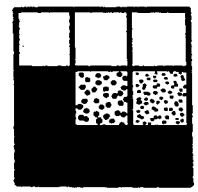

Referring to FIGS. 4a–b, two patterns are shown for single and multi-level anti-aliasing. In FIG. 4a, when a match is found between the pattern and an area in the bitmap-image, the pixels marked "A" and "B" are changed to gray in the replacement pattern. This process helps to reduce the visibility of "stair step" edges that characterize diagonal lines in a print.

Referring to FIG. 4b, an anti-aliasing pattern using two levels of gray is shown on the right. When a match is found for a "long step" (on the left), the matched area is modified by changing pixel "A" to dark gray and changing pixel "B" to light gray. The result of this two-level anti-aliasing method is a smoother appearance of the edge.

The basic algorithm for implementing pattern matching according to the present invention is discussed below. In normal operation the pattern is compared to successive areas in a bitmap-image. For a n×n template implemented in software, the template should be advanced n−1 pixels for each comparison. In this manner, redundant processing caused by advancing the template less than n−1 pixels is avoided and loss of context problems caused by advancing the template more than n−1 pixels are avoided.

In practice, the bitmap-image to be corrected is first copied into a destination bitmap. The template is scanned across the input bitmap-image, left-to-right, top-to-bottom, and when a match is found, changes are made directly to the destination bitmap. The pattern is logically "OR'ed" with the destination bitmap.

Pattern-lookup

Figures 5A, 5B, 5C:
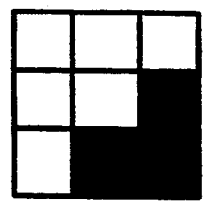
FIGS. 5a–c are the assignments of pixel location values for a 4×4 bit grid and a 3×3 bit grid.

Each bit in a template can be represented by an integer. For example, in a 4×4 template, the sixteen bits can be assigned the geometric series $2^0, 2^1, 2^2 \ldots 2^{15}$. Each "on" pixel is assigned a value according to FIG. 5a. A 3×3 pattern could be represented by the lower right corner of this grid as shown in FIG. 5b. An index value of the entire pattern can then be computed by summing the index values of all "on" pixels. For example, if a 3×3 pattern consisted of three "on" pixels in the lower right corner of the pattern, as can be seen in FIG. 5c, then the index value for the pattern would be $1+2+16$ or 19. As can be readily seen, every pattern will have a unique corresponding index value. This value can then be used to access a table of replacement patterns.

With this index number approach, the processing of the source image can occur in real-time. In real-time processing the first two scan lines are stored in memory. After the third bit of the third scan line has been transmitted from the image generation unit 7, a 3×3 source image then exists. This 3×3 image can be interpreted as an index number and the corresponding bit pattern is retrieved from a look-up table and copied to the destination image. Each new bit from the input image forms a new 3×3 bit image, and the method is repeated. Thus, in real-time, the source image is modified by the pattern matching board 11. Alternatively, in a full-page method, an entire page is stored in memory and 3×3 bit images are sequentially examined and treated as index numbers. Then, the corresponding replacement pattern is retrieved from the look-up table and copied to in the destination image.

A program is presented in the Appendix for taking a binary bitmap and a 3×3 template-matching table (array), and returning in OUTMAP, the anti-aliased version of the input according to the table.

In the above description reference was often made to 3×3 patterns as a specific example. The patterns contemplated can be any matrix n×m and even non-rectangular configuration. It should also be appreciated by one skilled in the art that the invention can be implemented both in hardware and software if fast enough for the particular task.

The above is a detailed description of a particular embodiment of the invention. The full scope of the invention is set out in the claims that follow and their equivalents. Accordingly, the claims and specification should not be construed to unduly narrow the full scope of protection to which the invention is entitled.

---

Appendix

```
(LAMBDA (INMAP AATABLE OUTMAP)  ;
 (PROG(TEMPMAP INDEX)
       (SETQ TEMPMAP (BITMAPCREATE 4 4))
       (OR OUTMAP (SETQ OUTMAP (COLORIZEBITMAP INMAP 0 255 8)))
       (for Y from (IDIFFERENCE (SUB1 (BITMAPHEIGHT INMAP)) 3) to 0 by −2
         do (for x from 0 to (SUB1 (BITMAPWIDTH INMAP)) by 2
             do (BITBLT INMAP X Y TEMPMAP 1 0 3 3)
                (SETQ INDEX (CREATETEXTUREFROMBITMAP TEMPMAP))
                (AND (NEQ INDEX 0)
                     (ELT AATABLE INDEX)
                     (BITBLT (ELT AATABLE INDEX) 0 0 OUTMAP X Y NIL NIL (QUOTE INPUT) (QUOTE REPLACE)))))
       (RETURN OUTMAP)))
```

---

What is claimed:

1. An apparatus for improving image quality in printing systems, comprising:
    an image generation unit generating a source image comprising bit-image data;
    a user interface coupled to said image generation unit;
    a pattern matching board coupled to said image generation unit and including:
        a storage device including look-up tables (LUTs) and storing a plurality of sets of reference bitmap-image patterns and replacement bitmap-image patterns, each of said replacement bitmap-image patterns corresponding to one reference bitmap-image pattern,
        means for comparing a portion of said source image data to said reference bitmap-image patterns and substituting a replacement bit-map image pattern corresponding to the reference bit-map image pattern matching said portion of said stored image for said portion of said source image to form a corrected image, and
        means for generating a bit stream from said corrected image;
    a xerographic processor coupled to said pattern matching board, said xerographic processor receiving said bit stream from said pattern matching board and generating printed bitmap-images;
    an interface controller coupled to said pattern matching board, said image generation unit, and said xerographic processor, said interface controller controlling the coupling of said image generation unit to said pattern matching board and the coupling of said pattern matching board to said xerographic processor, said interface controller selecting one of said plurality of sets of reference bitmap-image patterns and corresponding set of replacement bitmap-image patterns for said comparing means in said pattern matching board; and
    means for generating control bits selecting on a pixel by pixel basis a particular pattern match board.

2. An apparatus for improving image quality in printing systems, comprising:
    an image generation unit generating a source image comprising bit-image data;
    a user interface coupled to said image generation unit;
    a pattern matching board coupled to said image generation unit and including:
        a storage device including look-up tables (LUTs) and storing a plurality of sets of reference bitmap-image patterns and replacement bitmap-image patterns, each of said replacement bitmap-image patterns corresponding to one reference bitmap-image pattern,
        means for comparing a portion of said source image data to said reference bitmap-image patterns and substituting a replacement bit-map image pattern corresponding to the reference bit-map image pattern matching said portion of said stored image for said portion of said source image to form a corrected image, and
        means for generating a bit stream from said corrected image;
    a xerographic processor coupled to said pattern matching board, said xerographic processor receiving said bit stream from said pattern matching board and generating printed bitmap-images; and
    an interface controller coupled to said pattern matching board, said image generation unit, and said xerographic processor, said interface controller controlling the coupling of said image generation unit to said pattern matching board and the coupling of said pattern matching board to said xerographic processor, said interface controller selecting one of said plurality of sets of reference bitmap-image patterns and corresponding set of replacement bitmap-image patterns for said comparing means in said pattern matching board, wherein said user interface supplies command data to said interface controller via said image generation unit, whereby said user interface controls the selection of said pattern matching board.

3. An apparatus for improving image quality in printing systems, comprising:

an image generation unit generating a source image comprising bit-image data;

a user interface coupled to said image generation unit;

a pattern matching board coupled to said image generation unit and including:

a storage device including look-up tables (LUTs) and storing a plurality of sets of reference bitmap-image patterns and replacement bitmap-image patterns, each of said replacement bitmap-image patterns corresponding to one reference bitmap-image pattern, wherein data input at said user interface is stored as bitmap-image pattern data in said pattern matching board;

means for comparing a portion of said source image data to said reference bitmap-image patterns and substituting a replacement bit-map image pattern corresponding to the reference bit-map image pattern matching said portion of said stored image for said portion of said source image to form a corrected image, and means for generating a bit stream from said corrected image;

a xerographic processor coupled to said pattern matching board, said xerographic processor receiving said bit stream from said pattern matching board and generating printed bitmap-images; and an interface controller coupled to said pattern matching board, said image generation unit, and said xerographic processor, said interface controller controlling the coupling of said image generation unit to said pattern matching board and the coupling of said pattern matching board to said xerographic processor, said interface controller selecting one of said plurality of sets of reference bitmap-image patterns and corresponding set of replacement bitmap-image patterns for said comparing means in said pattern matching board.

4. An apparatus for improving image quality in printing systems, comprising:

an image generation unit generating a source image comprising bit-image data;

a pattern matching board coupled to said image generation unit and including:

a storage device storing a plurality of sets of reference bitmap-image patterns and replacement bitmap-image patterns, each of said replacement bitmap-image patterns corresponding to one reference bitmap-image pattern, means for comparing a portion of said source image data to said reference bitmap-image patterns and substituting a replacement bit-map image pattern corresponding to the reference bit-map image pattern matching said portion of said stored image for said portion of said source image to form a corrected image, and means for generating a bit stream from said corrected image;

a xerographic processor coupled to said pattern matching board, said xerographic processor receiving said bit stream from said pattern matching board and generating printed bitmap-images, said xerographic processor is further coupled to said interface controller and said xerographic processor generates feedback signals from a printed image via an image sensor or from xerographic sensors in the IOT and transmits said feedback signals to said interface controller, whereby said interface controller selects a particular pattern look-up table in dependence on said feedback signals; and an interface controller coupled to said pattern matching board, said image generation unit, and said xerographic processor, said interface controller controlling the coupling of said image generation unit to said pattern matching board and the coupling of said pattern matching board to said xerographic processor, said interface controller selecting one of said plurality of sets of reference bitmap-image patterns and corresponding set of replacement bitmap-image patterns for said comparing means in said pattern matching board.

5. A method of improving image quality of text and graphics data in write-black and write-white printing systems for both black and white and color, comprising:

generating a source image comprising bitmap-image data;

processing said source image in a pattern matching board using a plurality of stored sets of reference and replacement bitmap-image patterns, such that said source image is copied to a destination image, the pattern matching board is selected depending on the type of image being processed;

comparing a portion of said source image to said reference bitmap-image patterns stored in a memory, each of said reference bitmap-image patterns corresponding to one replacement bitmap-image pattern;

replacing said portion of said stored destination image with the replacement bitmap-image pattern corresponding to the reference bitmap-image pattern that matches said portion of said source image, said replacement bitmap-image patterns comprising intermediate levels of darkness; and displaying said destination image at an output device.

6. A method of improving image quality of text and graphics data in write-black and write-white printing systems for both black and white and color, comprising:

generating a source image comprising bitmap-image data;

processing said source image in a pattern matching board using a plurality of stored sets of reference and replacement bitmap-image patterns, such that said source image is copied to a destination image, the pattern matching board is selected depending on the color of the image being processed;

comparing a portion of said source image to said reference bitmap-image patterns stored in a memory, each of said reference bitmap-image patterns corresponding to one replacement bitmap-image pattern;

replacing said portion of said stored destination image with the replacement bitmap-image pattern corresponding to the reference bitmap-image pattern that matches said portion of said source image, said replacement bitmap-image patterns comprising intermediate levels of darkness; and displaying said destination image at an output device.

7. A method of improving image quality of text and graphics data in write-black and write-white printing systems for both black and white and color, comprising:

generating a source image comprising bitmap-image data;

processing said source image in a pattern matching board using a plurality of stored sets of reference and replacement bitmap-image patterns, such that said source image is copied to a destination image, the pattern matching board is selected depending on the desired darkness of the image being processed;

comparing a portion of said source image to said reference bitmap-image patterns stored in a memory, each of said reference bitmap-image patterns corresponding to one replacement bitmap-image pattern;

replacing said portion of said stored destination image with the replacement bitmap-image pattern corresponding to the reference bitmap-image pattern that matches said portion of said source image, said replacement bitmap-image patterns comprising intermediate levels of darkness; and displaying said destination image at an output device.

8. A method of improving image quality of text and graphics data in write-black and write-white printing systems for both black and white and color, comprising:

generating a source image comprising bitmap-image data;

processing said source image in a pattern matching board using a plurality of stored sets of reference and replacement bitmap-image patterns, such that said source image is copied to a destination image;

inputting at a user terminal the corresponding bitmap-image pattern data and bitmap-image pattern data for said pattern matching board;

comparing a portion of said source image to said reference bitmap-image patterns stored in a memory, each of said reference bitmap-image patterns corresponding to one replacement bitmap-image pattern;

replacing said portion of said stored destination image with the replacement bitmap-image pattern corresponding to the reference bitmap-image pattern that matches said portion of said source image, said replacement bitmap-image patterns comprising intermediate levels of darkness; and displaying said destination image at an output device.

9. A method of improving image quality of text and graphics data in write-black and write-white printing systems for both black and white and color, comprising:

generating a source image comprising bitmap-image data;

processing said source image in a pattern matching board using a plurality of stored sets of reference and replacement bitmap-image patterns, such that said source image is copied to a destination image;

comparing a portion of said source image to said reference bitmap-image patterns stored in a memory, each of said reference bitmap-image patterns corresponding to one replacement bitmap-image pattern; each bit in said portion of said source image and said bitmap-image pattern is assigned an exclusive number value, said bits being on or off, whereby for all bits that are on in said portion of said source image a look-up number is computed by summing said exclusive number values, said look-up number for said portion of said source image corresponding to a matching pattern in said pattern matching board;

replacing said portion of said stored destination image with the replacement bitmap-image pattern corresponding to the reference bitmap-image pattern that matches said portion of said source image, said replacement bitmap-image patterns comprising intermediate levels of darkness; and displaying said destination image at an output device.

* * * * *